United States Patent [19]

Kawasaki et al.

[11] Patent Number: 5,187,782

[45] Date of Patent: * Feb. 16, 1993

[54] DATA PROCESSING SYSTEM

[75] Inventors: Ikuya Kawasaki, Kodaira; Keiichi Kurakazu, Tachikawa; Hideo Maejima, Hitachi, all of Japan

[73] Assignee: Hitachi, Ltd., Tokyo, Japan

[*] Notice: The portion of the term of this patent subsequent to Jan. 30, 2007 has been disclaimed.

[21] Appl. No.: 552,117

[22] Filed: Jul. 13, 1990

Related U.S. Application Data

[63] Continuation of Ser. No. 415,722, Oct. 2, 1989, Pat. No. 4,954,943, which is a continuation of Ser. No. 15,016, Feb. 17, 1987.

[30] Foreign Application Priority Data

Feb. 26, 1986 [JP] Japan .................................. 61-39192

[51] Int. Cl.⁵ ................................................ G06F 9/34
[52] U.S. Cl. .............................. 395/375; 364/DIG. 1; 364/262.81; 364/263; 364/263.1
[58] Field of Search .......................... 395/375, 400, 800

[56] References Cited

U.S. PATENT DOCUMENTS

| | | | |
|---|---|---|---|
| 3,958,221 | 5/1976 | Serra et al. | 395/375 |
| 4,028,670 | 6/1977 | Hoffman et al. | 395/375 |
| 4,398,245 | 8/1983 | Fujita | 395/400 |
| 4,454,578 | 6/1984 | Matsumoto et al. | 395/375 |
| 4,521,851 | 6/1985 | Trubisky et al. | 395/375 |
| 4,616,313 | 10/1986 | Aoyagi et al. | 395/375 |
| 4,631,672 | 12/1986 | Sakamoto | 395/375 |
| 4,897,787 | 1/1990 | Kawasaki et al. | 395/375 |
| 4,954,943 | 9/1990 | Kawasaki et al. | 395/375 |

*Primary Examiner*—Michael R. Fleming
*Assistant Examiner*—Debra A. Chun
*Attorney, Agent, or Firm*—Antonelli, Terry, Stout & Kraus

[57] ABSTRACT

An instruction is constituted by a plurality of words, minimum necessary information necessary for effective address calculation of an operand is stored in a leading word and a word or words containing an operation specification field (operation words) are arranged to continue the first word. According to this system, the operation word can be decoded concurrently with the address calculation of the operand or the operand fetch operation. Therefore, there is no need to secure a time exclusively for decoding the operation word and the execution speed of the instruction requiring the operand can be improved.

20 Claims, 5 Drawing Sheets

DATA PROCESSING SYSTEM

This application is a continuation of application Ser. No. 415,722, filed Oct. 2, 1989, now U.S. Pat. No. 4,954,943, which is a continuation of Ser. No. 015,016, filed Feb. 17, 1987, now U.S. Pat. No. 4,897,787, issued Jan. 30, 1990.

BACKGROUND OF THE INVENTION

This invention relates to data processing techniques and more particularly, to a technique which is effective particularly when applied to an instruction system of a program control type, such as the technique which is effective when utilized for the instruction construction system using operands for execution of an instruction.

Instructions in a program control type system include a 2-operand instruction using two operands for instruction execution, a 1-operand instruction using one operand and a 0-operand instruction not requiring any operand. Among them, calculation of effective addresses of operands must be made twice in the 2-operand instruction, and two methods are known involving the construction of the 2-operand instruction. One involves a method which combines operation codes and information necessary for the calculation of the two operands into one word (an instruction addressing unit; see "Hitachi Microcomputer, Semiconductor Data Book, 8/16-bit Microcomputer", pp. 945-952, published in September, 1982 by Hitachi, Ltd.).

This instruction system provides the advantage that the information necessary for the effective address calculation of operation codes and operands can be decoded simultaneously and the execution speed of the 2-operand instruction is high. However, if the information necessary for the calculation of the two operands are put into the same word together with the operation codes, the width of the operation specification field becomes small so that the number (kind) of different instructions capable of being provided becomes small.

In this case, the bit number of one word can be increased, in principle, in order to prevent a decrease of the number of kinds of instructions. However, this means an increase in the bit number of the information to be decoded simultaneously, and hence the circuit scale of the decoder becomes extremely large.

The other construction system of the 2-operand instruction puts the first operation specification field and the second operand specification field into separate words and executes the instruction by use of a plurality of words. This instruction system can expand the field width of the operation specification field in comparison with the system which puts the first operation specification field and the second operand specification field into the same word, and can therefore increase the number of kinds of instructions. Since this system can reduce the bit number of the data to be decoded at one time, this system also can reduce the circuit scale of the decoder.

In accordance with the conventional system which employs the 1- or 2-operand instruction formed by a plurality of words, however, the word containing the operand specification field is arranged to follow the word containing the operation specification field, that is, the operation word. Accordingly, the operation word is first decoded to know the necessity of address calculation, then the word containing the operand specification field is decoded to calculate the effective address and the operand is fetched on the basis of the calculation result. Thereafter, the instruction is executed. For this reason, the execution speed of the instruction is very low.

SUMMARY OF THE INVENTION

The present invention is directed to an instruction system which can increase the number of instructions (kind of instructions) without lowering the execution speed of the instructions.

The above and other objects and novel features of the present invention will become more apparent from the following detailed description when taken in conjunction with the accompanying drawings.

Among the features disclosed herein, the following will illustrate the present invention.

In accordance with the invention, an instruction is composed of a plurality of words, minimum necessary information necessary for the effective address calculation of an operand is stored in a first word, and a word or words containing an operation specification field are arranged to follow the first words. According to this system, the effective address calculation of the operand and the operand fetch can be started before the word containing the operation specification field is decoded, and while the address calculation or the operand fetch is being effected, the operation word is decoded and the instruction can be executed as soon as the address calculation of the operand or the operand fetch is complete.

According to the means described above, the decoding operation of the word containing the operation specification field and the address calculation or operand fetch operation can be carried out concurrently. Therefore, the execution speed of the instruction which requires the operand can be improved. Since the instruction consists of a plurality of words, the number of kinds of instructions can be increased and the increase in the scale of the decoder can be limited.

DESCRIPTION OF THE PREFERRED EMBODIMENTS

Figure 1:
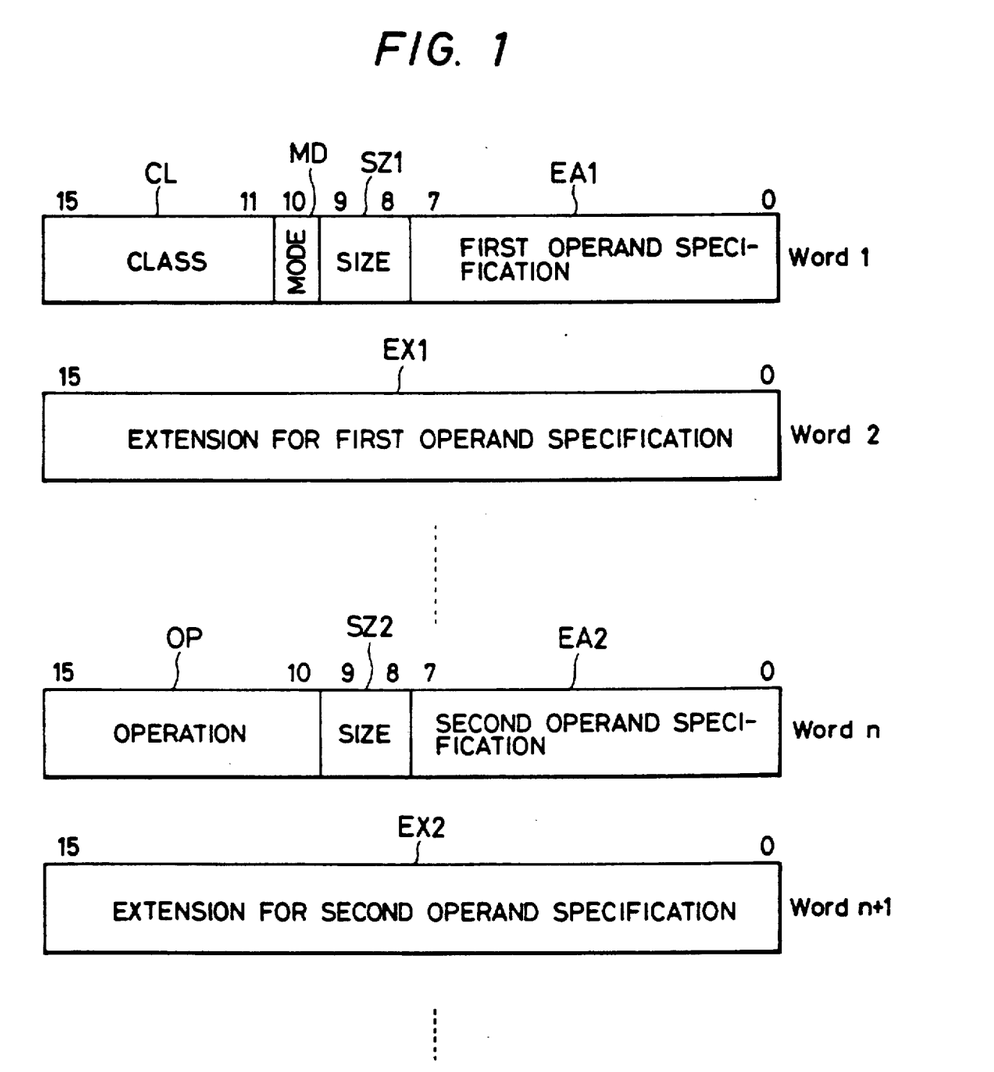
FIG. 1 is an explanatory view showing an construction example of an instruction format in the present invention.

FIG. 1 shows an embodiment of an instruction system of a 2-operand instruction when the present invention is applied to a system using 16 bits as an instruction read unit.

In other words, a microprocessor for executing the 2-operand instruction of this embodiment is based on the use of 16 bits as the, basic unit. Therefore, the address for an instruction has 16 bits as a minimum unit. Since the 16 bits are read always simultaneously in the microprocessor, there is no essential meaning in the disposition inside the 16 bits. Such a minimum unit of instruction will be called a "word".

The 2-operand instruction shown in FIG. 1 contains in its first word (Word 1) the operand specification field EA1 in which the data necessary for calculating the effective address of the first operand is encoded. Though not particularly limitative, the operand specification field EA1 consists of 8 bits.

The 8-bit codes constituting the operand specification field EA1 are defined in Table 1 below, though not particularly limitative.

TABLE 1

| Bit construction in EA1 | Address mode |
|---|---|
| 0 0 0 P R n | register indirect addressing |
| 0 0 1 P R n | register relative addressing with 16-bit displacement |
| 0 1 0 P R n | register relative addition mode |
| 0 1 1 P R n | register direct |
| 0 1 1 1 P 0 0 0 | program counter relative addition mode |
| 0 1 1 1 P 0 0 1 | program counter relative, with 16-bit displacement |
| 0 1 1 1 P 0 1 0 | stack pointer relative post-increment |
| 0 1 1 1 P 0 1 1 | stack pointer relative pre-decrement |
| 0 1 1 1 0 1 S S | absolute address |
| 0 1 1 1 1 1 S S | immediate |
| 1 0 0 P Disp | frame pointer relative short displacement |
| 1 0 1 P Disp | stack pointer relative short displacement |
| 1 1 1 1 Lit | short literal |

In Table 1 above, P is an address pointer size designation bit. When 0, is designates 32 bits, for example, and when 1, 64 bits. Rn is a register number designation bit, Disp is a displacement value and Lit is a literal value, that is, an immediate value. SS represents a bit construction of an extension field. When SS is 01, it means 16 bits and when 10, 32 bits and when 11, 64 bits, respectively.

In Table 1, the term "frame pointer relative short displacement" and the term "stack pointer relative short displacement" represent the address mode with relative displacement from the frame pointer and the address mode with relative displacement from the stack pointer, respectively. Since the displacement value is 4 bits, these modes are applied when the value is small. Since the displacement value is set inside the operand specification field in accordance with these modes, the displacement value need not be set in fields such as the extension field.

The codes can be obtained in the following manner by the code instruction shown in Table 1.

In the "stack pointer relative short displacement", for example, the operand is constituted by the content at the address which is incremented by the displacement value of the operand specification field to the address value pointed by the stack pointer of the memory address.

In FIG. 1, class specification field CL, mode specification field MD and size specification field SZ1 are shown disposed in the first word Word 1 besides the operand specification field EA1. In this instruction, the class specification field CL consists of the upper 5 bits among the 16 bits and designates that this instruction is a 2-operand instruction when these upper order 5 bits are under one specific state (e.g. all "1" or all "0").

The mode specification field MD and the size specification field SZ1 consist of 1 bit and 2 bits, respectively, and each code is defined as shown in Table 2, for example. In other words, the mode specification field MD designates whether or not the operand is fetched after address calculation. Among instructions, there is an instruction which effects only the address calculation without operand fetch and puts the result of calculation into a desired register. Such an instruction can be identified by use of this bit.

TABLE 2

| FIELD | BITS | INSTRUCTION |
|---|---|---|
| MD | 0 | CALCULATE AN EFFECTIVE ADDRESS OF OPERAND AND FETCH THE OPERAND. |
| | 1 | CALCULATE AN EFFECTIVE ADDRESS OF OPERAND. |
| SZ1 | 0 0 | OPERAND SIZE IS 8 BITS. |
| | 0 1 | OPERAND SIZE IS 16 BITS. |
| | 1 0 | OPERAND SIZE IS 32 BITS. |
| | 1 1 | OPERAND SIZE IS 64 BITS. |

On the other hand, the size specification field SZ1 designates the operand size from 8, 16, 32 and 64 bits. According to this designation, the data having the bit number corresponding to this code can be taken out from the memory or register.

Among the 2-operand instructions, the extension field for storing the displacement (or offset) needs one, two or more words in accordance with the addressing mode such as the register relative addressing mode. Therefore, in this embodiment, the extension field EX1 of the first operand is arranged in such a manner as to form the second word Word 2 following the first word.

The operation specification field OP for designating the detail of the operations such as addition and subtraction is put into an nth word following the first operand extension field EX1. However, the 16 bits are not all necessary for the width of the operation specification field OP depending upon the kind of necessary instructions. In this embodiment, therefore, the upper 6 bits of the nth word are reserved as the operation specification field OP, and 8-bit wide second operation specification field EA2 and 2-bit wide size designation field SZ2 designating the size of the second operand are disposed in the remaining field.

In the manner described above, the operation specification field OP and the second operand specification field EA2 constitute the nth word and the extension field EX2 of the second operand is arranged to follow as (n+1)th word and so forth, whenever necessary.

Figure 4:
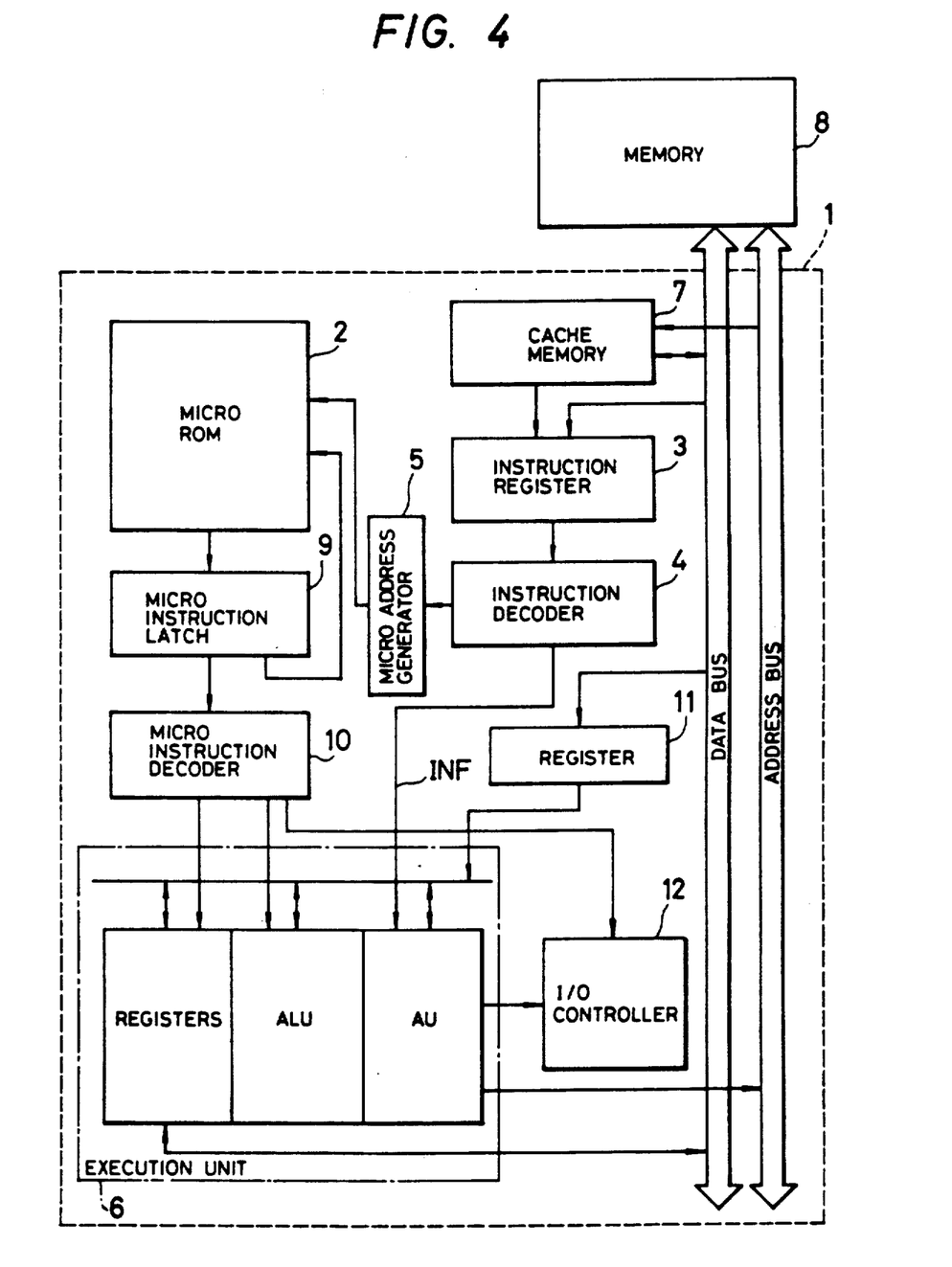
FIG. 4 is a block diagram showing construction example of a micro processor executing the instruction of the present invention.

FIG. 4 shows an example of the hardware construction of a microprocessor operated by the instruction system having a 2-operand instruction in accordance with the present invention.

The microprocessor of this embodiment is equipped with a controller unit of a microprogram control system. In other words, a micro ROM (Read Only Memory) 2 storing a microprogram is disposed inside an LSI chip constituting the microprocessor. Access is made to the micro ROM 2 by a micro address generator 5 and sequentially outputs micro instructions that constitute the microprogram.

Signals obtained by decoding the codes of the macro instruction fetched to an instruction register 3 are supplied to the micro address generator 5. The micro address generator 5 generates the corresponding micro address on the basis of the signal and supplies it to the micro ROM 2. In this manner, the first instruction of a series of microinstructions in a microinstruction group for executing the macro instruction is read out. The micro instruction code generates a control signal for an execution unit 6 consisting of various temporary registers, data buffers, arithmetic and logic units ALUs, an address calculation unit AU, and the like.

The second and subsequent micro instructions among the series of microinstructions in the micro instruction group corresponding to the macro instruction are read out when the code of the next address field of the micro instruction that has been read out immediately before is supplied to the micro ROM 2. In other words, a micro instruction latch 9 is disposed in order to hold the next address inside the micro instruction immediately before, and the second and subsequent micro instructions are read out on the basis of the output of the latch 9 and the address from the micro address generator 4. The series of micro instructions thus read out are decoded by a micro instruction decoder 10 and the execution unit 6 is controlled by its output control signal, thereby executing the macro instruction.

The address calculation unit AU calculates the address of the operand on the basis of the data of the extension field EX for designating the address of the operand (e.g. Word 2 shown in FIG. 1) and the data inside a predetermined register inside the execution unit 6. The extension field EX is not decoded by the instruction decoder 4 but is supplied to the address calculation unit AU through a register 11 which is exclusively assigned to the extension field. Address calculation information INF obtained by decoding the instruction containing the operand specification field EA (e.g. Word 1 in FIG. 1) controls the address calculation unit AU.

This embodiment employs a buffer memory system, though it is not particularly limitative. Therefore, a cache memory 7 is disposed inside the micro processor LSI and program data having a high access frequency among the data inside an external memory 8 are registered into the cache memory 7. This speeds up retrieval of the programs.

Since the 2-operand instruction is constituted by a plurality of words in this embodiment as described above, the field width of the operation specification field OP can be increased. Therefore, the kinds of instructions can be increased, too. Moreover, since the data necessary for the effective address calculation of the first operand (source operand) is stored in the first word, the address calculation of the operand can be started by merely fetching the first word and decoding it. In other words, the extension field of the second word is supplied to the address calculation unit AU without being decoded, and for this reason, the address calculation can be started immediately after completion of decoding of the first word. While this address calculation is being effected, the instruction register 3 and the instruction decoder 4 are idle, and so the micro instruction corresponding to the operation code can be read out in the mean time by receiving the nth word containing the operation specification field OP during the address calculation or while the first operand is being fetched.

Incidentally, the term "operand fetch" means that the content of the operand stored in the external memory 8 or the like is stored in a predetermined register inside the execution unit 6, and is executed by an I/0 controller 12 or the like that receives the control signal outputted from the micro instruction decoder 10. The address of the operand is calculate by the afore-mentioned address calculation unit AU.

Figure 5A:
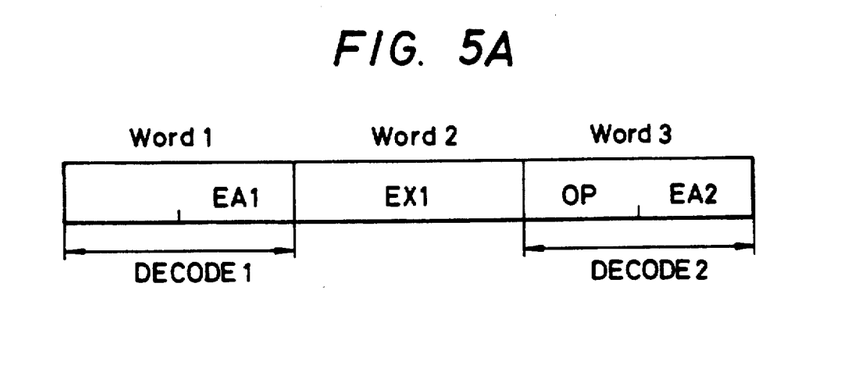
FIG. 5A shows an example of the instruction format of the present invention.
Figure 5B:
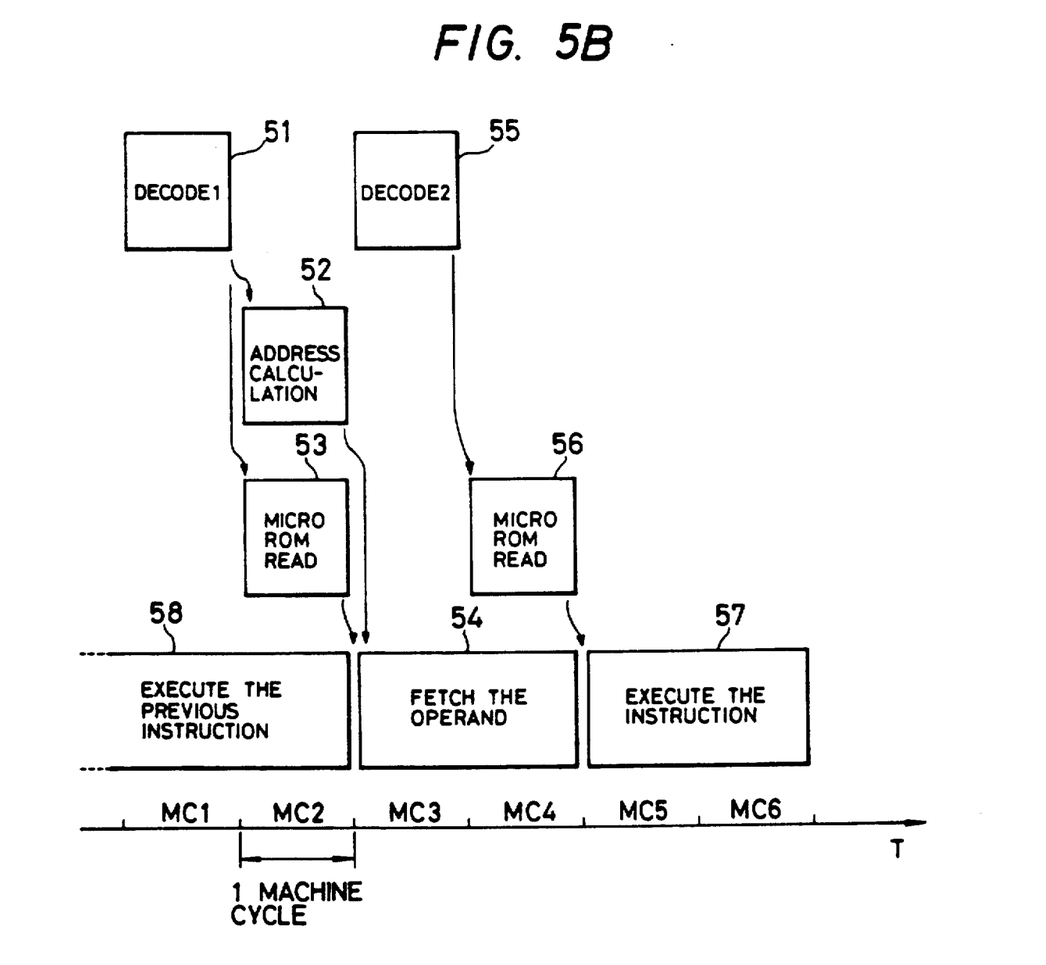
FIG. 5B shows the execution sequence of the instruction shown in FIG. 5A.

FIG. 5A shows one example of the format of the 2-operand instruction consisting of three words. FIG. 5B shows an execution sequence when the instruction having the format shown in FIG. 5A is executed by the micro processor shown in FIG. 4. As shown in FIG. 5A, the first word Word 1 contains the first operand specification field EA1, the second word 2 contains the extension field EX1 for the first operand specification and the third word Word 3 contains the operation code specification field OP and the second operand specification field EA2. As shown in FIG. 5B, the first word Word 1 is first decoded (51) by the instruction decoder 4 shown in FIG. 4 during the period of a first machine cycle MC1 to form the information INF necessary for calculating the address of the operand and the address information of the micro ROM. Next, the address calculation of the first operand is effected (52) on the basis of the information of the second word Word 2 and the address calculation information INF described above in the machine cycle MC2. In the machine cycle MC2, the micro information from the micro ROM is read out (53) together with the execution (52) of the address calculation described above. When this micro instruction designates fetch of the operand, the operand fetch is executed (54) in the machine cycles MC3 and MC4.

In the machine cycle MC3 described above, decoding of the third word Word 3 is executed (55) together with the operand fetch operation (54). In the machine cycle MC4, the micro instruction is read out (56) on the basis of this address information. This micro instruction contains the control information for executing the operation designated by the operation code specification field OP. Since the operand necessary for executing this operation has already been fetched (54), the operation can be executed (57) immediately from the machine cycle MC5. Incidentally, since this 3-word instruction does not have the extension field for designating the second operand, the address calculation using the extension field is not effected. In addition, this embodiment represents the case where fetch of the second operand is not necessary. The case where fetch of the second operand is not necessary such as the case described above is when the position of the second operand is at the register inside the micro processor.

When the instruction format of the present invention is employed as described above, the operation code can be decoded while the micro processor prepares for the operand necessary for executing the instruction, that is, while it calculates the address of the operand and fetches its content to the predetermined register. Therefore, the time necessary exclusively for decoding the operation code becomes unnecessary, and the execution speed of the instruction can be increased.

In the embodiment described above, the decoding stage (55) of the third word Word 3 overlaps with the stage (54) of the operand fetch, but this is not essential. In other words, the decoding stage (55) of the third word Word 3 may overlap with the address calculation stage (52) When the operand fetch stage (54) does not exist, for example, the arrangement described above can start the instruction execution stage (57) earlier by one machine cycle.

Figure 6A:
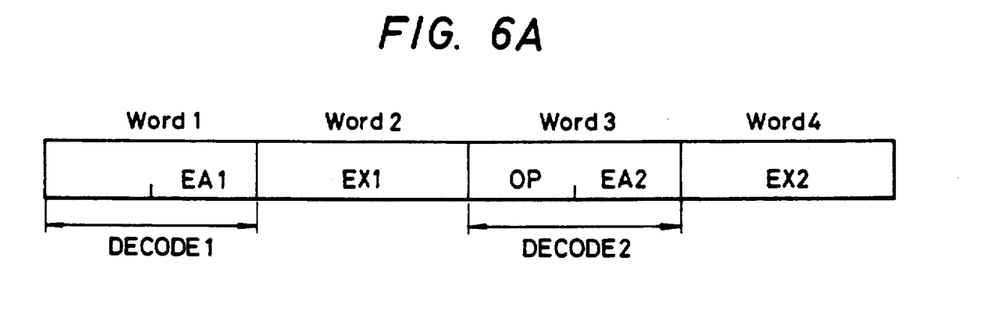
FIG. 6A shows another example of the instruction format of the present invention.
Figure 6B:
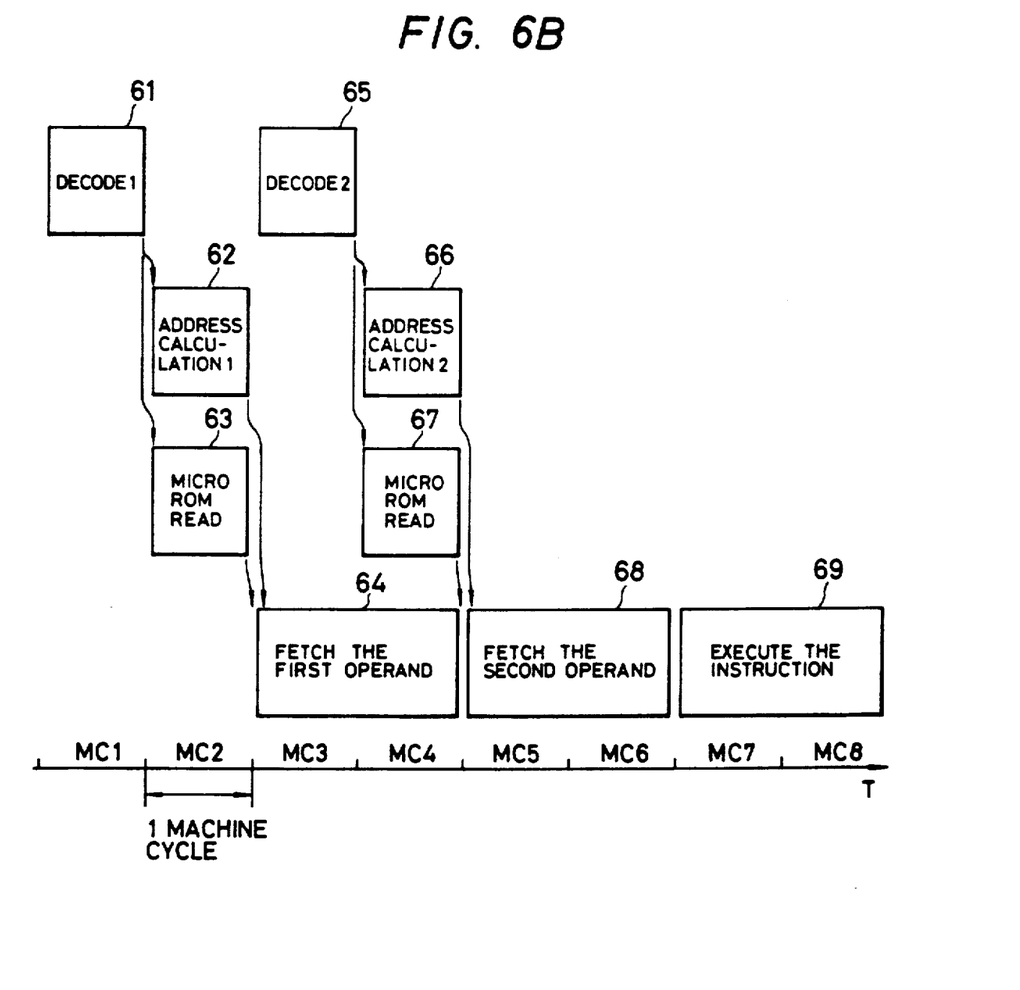
FIG. 6B shows the execution sequence of the instruction shown in FIG. 6A.

FIG. 6A shows one example of the format of the 2-operand instruction constituted by four words. The first word Word 1 contains the first operand specification field EA1, the second word Word 2 contains the extension field EX1 for the first operand specification, the third word Word 3 contains the operation code specification field OP and the second operand specification field EA2 and the fourth word Word 4 contains the extension field EX2 for the second operand specification. FIG. 6B shows the execution sequence when the instruction having the format shown in FIG. 6A is executed by the micro processor shown in FIG. 4.

First of all, the first word Word 1 is decoded (61) by the instruction decoder 4 shown in FIG. 4 in the first machine cycle MC1 to form the information INF necessary for calculating the address of the operand the address information of the micro ROM. Next, the address calculation of the first operand is made (62) in the machine cycle MC2 on the basis of the information of the second word Word 2 and the address information INF described above. In the machine cycle MC2, the micro instruction is read out (63) from the micro ROM together with the execution (62) of the address calculation When this micro instruction designates the fetch of the operand, the operand fetch is executed (64) in the machine cycles MC3 and MC4. In this machine cycle 3, the third word Word 3 is decoded (65) together with the operand fetch operation (64) described above, thereby generating the information INF necessary for calculating the address of the second operand and the address information of the micro ROM. In the machine cycle MC4, the address calculation of the second operand is executed (66) on the basis of the information of the fourth word Word 4 and the address calculation information INF described above. In the machine cycle MC4, the micro instruction from the micro ROM is read out (67) together with the execution (66) of the address calculation. When this micro instruction designates the fetch of the operand, the operand fetch is executed (68) in the machine cycles MC5 and MC6. The micro instruction thus read out (67) contains the control information for executing the operation designated by the operation code specification field OP. Since the operand necessary for executing this operation has already been fetched (68, 69), the operation can be executed (69) immediately.

When the instruction format of the present invention is employed as described above, the operation code can be decoded while the micro processor prepares for the first operand necessary for the instruction execution, that is, while the address of the operand described above is calculated and the content of the operand is fetched to the predetermined register. Therefore, it is not necessary to prepare for the time necessary exclusively for decoding the operation code, and the execution speed of the instruction can be increased.

Though the foregoing embodiments illustrate the case of the 2-operand instruction, the present invention can also be applied to the 1-operand instruction. In this regard, the effect of the present invention can be obtained if the operation code can be decoded while the first operand is prepared or simultaneously with such an operation.

Not all of a plurality of instructions for operating the micro processor need be composed of the instruction format in accordance with the present invention, and the instruction formats different from that of the present invention may be employed. Therefore, it is possible to constitute a series of information by use of an instruction having the format shown in FIG. 1 and the instructions having the formats shown in FIGS. 2 and 3. In this case, the execution speed of the series of instructions will drop if there is any period during which the micro processor does not operate substantially, between the execution stage of a certain instruction and the execution stage of a next instruction. It is therefore preferred that the operations (54, 57) based on the next operation be continued immediately after the execution (58) of a certain instruction as shown in FIG. 5B, for example.

Figure 2:
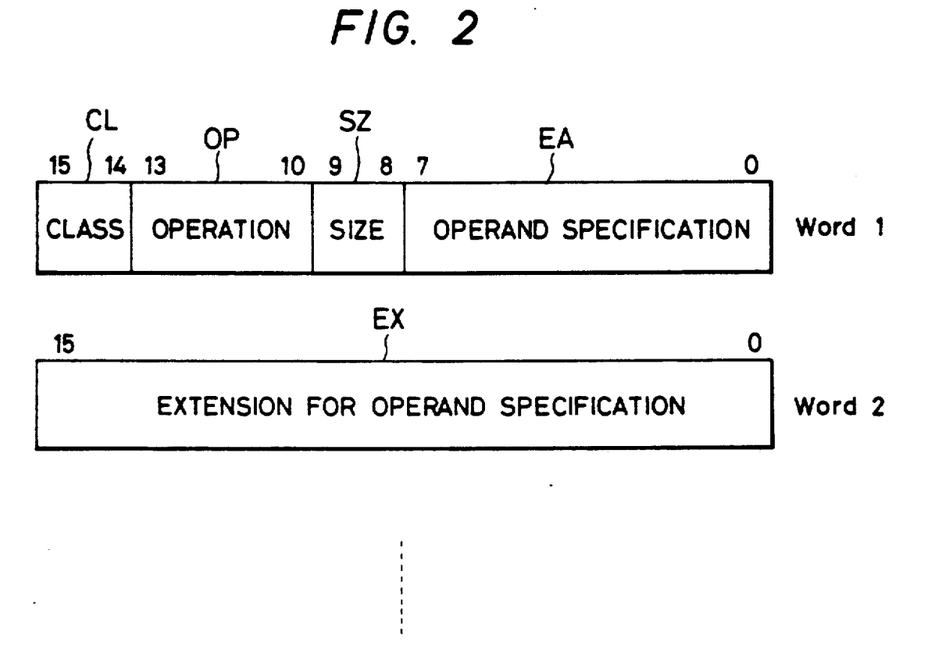
FIGS. 2 and 3 are explanatory views showing construction examples of a 1-operand instruction and a 0-operand instruction.
Figure 3:
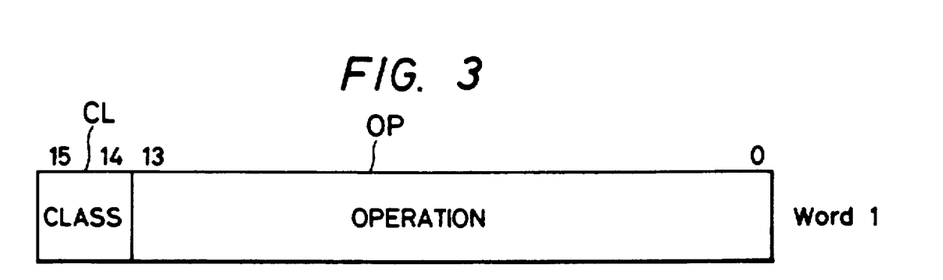

FIGS. 2 and 3 show examples of construction of the 1-operand instruction and 0-operand instruction, respectively. These instructions have a 2-bit class specification field CL, and this class specification field CL designates that the instruction is the 1-operand instruction and the 0-operand instruction, respectively.

The 1-operand instruction consists of the operation specification field EA and the operand size specification field SZ in the same way as the nth word of the 2-operand instruction described already. Therefore, the 1-operand instruction can rapidly execute the effective address calculation of the operand and the execution of the instruction. Incidently, when the 1-operand instruction has the extension field in the same way as the 2-operand instruction described already, the extension field is inserted after the second word and so forth following the word consisting of the operation specification field OP and the operand specification field EA. The operand specification field EA is constructed exactly in the same way as the operand specification fields EA1, EA2 of the 2-operand instruction.

In the 0-operand instruction, on the other hand, all the bits other than the class specification field CL are used for the operation specification field.

The present invention provides the following effects.

In the present invention, the instruction consists of a plurality of words, the information necessary for the effective address calculation of the operand is stored in the leading first word and the word or the words containing the operation specification field are arranged to follow the first word. Therefore, the effective address calculation of the operand can be started before the word containing the operation specification field is decoded, and while this address calculation and the operand fetch are being effected, the operation word is decoded. As soon as the address calculation of the operand and the operand fetch are complete, the instruction can be executed immediately. Accordingly, the number of instructions can be increased without lowering the execution speed of instruction.

Although the present invention has thus been described with reference to some preferred embodiments thereof the invention is not particularly limited thereto but can of course be changed or modified variously without departing from the spirit and scope thereof. For example, the foregoing embodiments illustrate the case of the format system of the 2-operand instruction wherein the fetch unit of instruction consists of 16 bits, but the present invention can be applied to the cases where the constituent unit of instruction is 8 bits or 32 bits besides the 16 bits. If the constituent unit of instruction is below 16 bits (such as 8 bits), it is difficult to constitute the 1-operand instruction by one word (8 bits in this case). Therefore, in accordance with the present invention, the word having the operation specification field is arranged to follow the word containing the operand specification field to solve this problem.

Although the present invention has been described primarily with reference to the case where it is applied to the instruction system of the micro processor which is the background and field of utilization of the present invention, the present invention can be utilized for instruction systems in general for data processing systems of the program control type such as computers and mini-computers, in addition to the micro-processor.

What is claimed is:

1. In a microprocessor formed on a chip for processing a multi-word instruction including a first word for holding operand address information and a second word for holding an operation code, said microprocessor comprising:
    a decoder for decoding each of said first and second words in said multi-word instruction, wherein said decoder decodes said first word to provide an operand indicated by said operand address information before said second word is decoded by said decoder to determine an operation to be performed;
    execution means for performing said operation determined by said decoder on said provided operand; and
    means for controlling said execution means in accordance with an output of said decoder.

2. A microprocessor according to claim 1, wherein said execution means includes address calculation means for calculating an address of said operand.

3. A microprocessor according to claim 2, wherein said execution means further comprises a register for storing said operand.

4. A microprocessor according to claim 3, wherein said controlling means includes a micro ROM including a plurality of microinstructions.

5. A microprocessor formed on a chip for processing an instruction including a first word having first information for specifying an address of an operand and size information for specifying the size of said operand and a second word having an operation code, said microprocessor comprising:
    decoder means for decoding said first information and said second word, wherein said decoder means decodes said second word to determine an operation to be performed after said first information is decoded by said decoder means to provide an operand on the basis of said size information and the decoded result of said first information;
    execution means for performing said operation determined by said decoder means on said provided operand; and
    control means for controlling said execution means in accordance with an output of said decoder means.

6. A microprocessor according to claim 5, further comprising means for fetching said operand having a size designated by said size information from an external memory.

7. A microprocessor according to claim 6, wherein said fetching means includes a register for storing said operand.

8. A microprocessor according to claim 7, wherein said decoder means includes a common decoder and wherein each of said first information and said second word is decoded by said common decoder.

9. A microprocessor according to claim 8, wherein said execution means includes address calculation means for calculating an address of said operand.

10. A microprocessor formed on a chip for processing an instruction including a first word having first information for specifying an address of a first operand and first size information for specifying the size of said first operand and a second word having an operation code and second information for specifying an address of a second operand, said microprocessor comprising:
    decoder means for decoding said first information and said second word, wherein said decoder means decodes said second word to determine an operation to be performed after said first information is decoded by said decoder means to provide a first operand on the basis of said first size information and the decoded result of said first information;
    execution means for performing said operation determined by said decoder means on said provided first operand and said second operand specified by said second information; and
    control means for controlling said execution means in accordance with an output of said decoder means.

11. A microprocessor according to claim 10, wherein said second word further comprises second size information for specifying the size of said second operand.

12. A microprocessor formed on a chip and for sequentially fetching at least two words of a plurality of words forming an instruction including a first word having first information for specifying an address of an operand and a second word having an operation code, said microprocessor comprising:
    decoder means for decoding said first and second words, wherein said second word is fetched after said first word is fetched and said second word is decoded by said decoder means to determine an operation to be performed after said first word is decoded by said decoder means to provide an operand;
    execution means for performing an operation determined by said decoder means or an operand provided by said decoder means; and
    control means for controlling said execution means in accordance with an output of said decoder means.

13. A microprocessor according to claim 12, wherein said control means includes means having an instruction register for sequentially fetching said words.

14. A microprocessor according to claim 13, wherein said second word further includes second information for specifying an address or a second operand, wherein said execution means performs said determined operation between said operand and said second operand.

15. A microprocessor according to claim 12, wherein said second word further includes second information for specifying an address of a second operand, wherein said execution means performs said determined operation between said operand and said second operand.

16. A microprocessor for use with an external memory for storing at least an operand, said microprocessor formed on a chip for processing an instruction including a first word having first information for specifying said operand and a second word having an operation code, said microprocessor comprising:
    a decoder for decoding each of said first and second words in said instruction, wherein said decoder decodes said first word to provide said operand before said second word is decoded by said decoder to determine an operation to be performed;
    execution means for performing said operation determined by said decoder on said operand; and
    means for controlling said execution means in accordance with an output of said decoder.

17. A microprocessor according to claim 16, wherein said execution means includes address calculation means for calculating an address of said operand in said external memory.

18. A microprocessor according to claim 17, wherein said execution means further comprises means for fetching said operand from said external memory.

19. A microprocessor according to claim 18, wherein said fetching means includes a register for storing said operand.

20. A microprocessor according to claim 16, wherein said execution means further comprises means for fetching said operand from said external memory.

* * * * *